(12) United States Patent
Segawa et al.

(10) Patent No.: US 8,382,632 B2
(45) Date of Patent: Feb. 26, 2013

(54) DIFFERENTIAL GEAR

(75) Inventors: Yosuke Segawa, Toyohashi (JP);
Masaru Maeda, Toyohashi (JP); Naoya Nishimura, Toyohashi (JP)

(73) Assignee: Musashi Seimitsu Industry Co., Ltd., Toyohashi-shi (JP)

( * ) Notice: Subject to any disclaimer, the term of this patent is extended or adjusted under 35 U.S.C. 154(b) by 766 days.

(21) Appl. No.: 12/379,592

(22) Filed: Feb. 25, 2009

(65) Prior Publication Data
US 2009/0215573 A1  Aug. 27, 2009

(30) Foreign Application Priority Data
Feb. 27, 2008 (JP) ................... 2008-045421

(51) Int. Cl.
*F16H 48/06* (2006.01)
*F16H 57/02* (2012.01)
(52) U.S. Cl. .............. 475/230; 74/606 R; 29/893.1
(58) Field of Classification Search .......... 475/220, 475/230; 74/606 R
See application file for complete search history.

(56) References Cited

U.S. PATENT DOCUMENTS

| | | | | |
|---|---|---|---|---|
| 724,393 A | * | 3/1903 | Lindsay | 475/230 |
| 1,158,439 A | * | 11/1915 | Bunting | 475/230 |
| 1,396,225 A | * | 11/1921 | Logue et al. | 475/226 |
| 5,557,986 A | * | 9/1996 | Young et al. | 74/650 |
| 5,584,777 A | * | 12/1996 | Sander et al. | 475/230 |
| 6,066,063 A | * | 5/2000 | Ishikawa | 475/234 |
| 6,659,651 B1 | * | 12/2003 | Turner et al. | 384/585 |
| 7,470,207 B2 | * | 12/2008 | Todd et al. | 475/230 |
| 2008/0138649 A1 | * | 6/2008 | Mataga et al. | 428/684 |
| 2009/0266198 A1 | * | 10/2009 | Nosakowski | 74/606 R |

FOREIGN PATENT DOCUMENTS

| | | |
|---|---|---|
| JP | A-7-54961 | 2/1995 |
| JP | A-2005-504943 | 2/2005 |
| WO | WO 03/031843 A1 | 4/2003 |

* cited by examiner

*Primary Examiner* — Justin Holmes
*Assistant Examiner* — Jacob S Scott
(74) *Attorney, Agent, or Firm* — Oliff & Berridge, PLC

(57) ABSTRACT

A differential case includes a first boss part into which a first drive shaft is inserted, and a second boss part into which a second drive shaft opposed to the first drive shaft is inserted. The differential case is composed of: a first case body extending from pinion-shaft assembling parts on which a pinion shaft is assembled, to a ring gear; a second case body having the first boss part; and a third case body having the third boss part. The first case body is integrally formed by forging. The second case body is integrally formed by forging. The third case body is integrally formed by forging. The first case body and the second case body are joined to each other by welding. The first case body and the third case body are joined to each other by welding.

6 Claims, 5 Drawing Sheets

DIFFERENTIAL GEAR

FIELD OF THE INVENTION

The present invention relates to a differential gear including: a ring gear configured to be rotated by a driving force inputted thereto from a driving source; a differential case configured to be rotated together with the ring gear; a pinion shaft assembled on the differential case, the pinion shaft being configured to be rotated together with the differential case; pinion gears rotatably mounted on the pinion shaft; and side gears configured to be meshed with the pinion gears.

BACKGROUND ART

There has been conventionally known a differential gear used in a vehicle such as an automobile, which transmits a driving force (torque) from an engine, through a ring gear, a differential case assembled on the ring gear, a pinion shaft assembled on the differential case, pinion gears assembled on the pinion shaft, and side gears configured to be meshed with the pinion gears. The pinion shaft, the pinion gears, and the side gears, are provided inside the differential case.

As a method for forming such a differential gear, the following forming method has been known from JP2005-504943T.

At first, a differential case (body 1) is composed of a first case body (cage 2) and a second case body (block member 3).

The first case body includes: on one end thereof, a first boss part (tubular part 14) into which a first drive shaft is inserted; and, on the other end thereof, a flange part (radial ring 18). The second case body includes, on the other end thereof, a second boss part (tubular part 20) into which a second drive shaft is inserted. The first case body (cage 2) is formed by forging.

Then, a pinion shaft (assembling pin 9), pinion gears 6, and side gears (shaft pinions 5) are respectively assembled in the differential case (body 1). Thereafter, a one-end-side outer circumferential surface (cylindrical surface 22) of the second case body (block member 3) is fitted into an other-end-side inner circumferential surface of an other-end-side opening (opening 10) of the first case body (cage 2).

Subsequently, the other-end-side inner circumferential surface of the first case body (cage 2) and the one-end-side outer circumferential surface (cylindrical surface 22) of the second case body (block member 3) are welded to each other, so that the first case body (cage 2) and the second case body (block member 3) are joined to each other.

Finally, a ring gear (crown wheel), which has been formed separately from the differential case (body 1), is brought into contact with the flange part (radial ring 18) of the differential case (body 1), and bolts are inserted into a plurality of bolt holes (holes 19 into which the bolts are inserted) formed in the ring gear (crown wheel) and the flange part (radial ring 18) of the first case body (cage 2), so that the ring gear (crown wheel) and the differential case (body 1) are assembled on each other. In this manner, a differential gear is completed.

In addition, as another method for forming a differential gear, the following forming method has been known from JP7-54961A.

At first, a differential case is composed of a first case body (support member 3), which includes a first boss part into which a first drive shaft (drive shaft 7) is inserted, and a second case body (lid 4), which includes a second boss part into which a second drive shaft (drive shaft 7) opposed to the first drive shaft (drive shaft 7) is inserted. The first case body (support member 3) and the second case body (lid 4) are formed by forging, respectively.

Then, a pinion shaft (differential pin 11), pinion gears (gears 12), and side gears (gears 8 and 9) are respectively assembled in the differential case. Thereafter, a one-end-side outer circumferential surface of the second case body (lid 4) is inserted into an other-end-side inner circumferential surface of an other-end-side opening (opening 22) of the first case body (support member 3).

Subsequently, the other-end-side opening (opening 22) of the first case body (support member 3) and the second case body (lid 4) are welded to each other, so that the first case body (support member 3) and the second case body (lid 4) are joined to each other.

Finally, a ring gear 1, which has been formed separately from the differential case, is fitted into a flange part 2 of the differential case, and the ring gear 1 and the differential case are joined to each other by welding, so that a differential gear is completed.

In the technique for assembling the ring gear and the differential case by means of bolts, which is disclosed by JP2005-504943T, a torque from the ring gear is transmitted only through positions on which the plurality of bolts are fastened (bolt fastening positions). For this reason, the bolt fastening positions, which are located between the ring gear and the differential case, are required to have a further durability; and thus the bolt fastening positions and areas surrounding the same are required to have increased thicknesses. However, this is disadvantageous in that a weight of the differential case is increased. In addition, since the plurality of bolts are necessary, the number of components of the differential gear is increased, which increases costs.

Further, the first case body (cage 2) extending from the first boss part to the flange part is formed by forging. Because of a long axial material-flow-length of the first case body (cage 2) and a long radial material-flow-length thereof, when the first cage body (cage 2) is formed by forging, there occurs a problem in that a heavy forming load has to be applied thereto.

On the other hand, in the forming method of JP7-54961A, since no bolt is used, there can be avoided that a weight of the differential case is increased, which may be caused by increasing thicknesses of the bolt fastening positions and the areas surrounding the same. There can be also avoided that the number of components is increased by a plurality of bolts resulting in cost increase. However, the welded part between the first case body (support member 3) and the second case body (lid 4) and the welded part between the first case body (support member 3) and the ring gear 1 are located in a "torque transmission area" through which a driving force of an engine is transmitted from the ring gear 1 to the side gears (gears 8 and 9). In this case, when a torque is transmitted, there is a possibility that the welding parts might be cracked, because strengths of the welding parts are relatively lower than those of the ring gear 1 and the first case body (support member 3). Namely, there is a problem in that a durability of the differential gear is poor.

In addition, the first case body (support member 3) extending from the first boss part to the other-end-side opening (opening 22) is formed by forging. Because of a long axial length of the first case body (support member 3), when the first case body (support member 3) is formed by forging, a heavy forming load has to be applied thereto.

SUMMARY OF THE INVENTION

The present invention has been made in order to solve the above problems. The object of the present invention is to provide a differential gear having the following advantageous features. Namely, the differential gear has a desired durability, but has a light weight structure because no bolt is used for fastening a differential case and a ring gear to each other. Since no bolt is used, the number of components can be decreased, whereby costs can be decreased. In addition, since an axial size of an element to be forged is reduced, forging of the element can be facilitated. Another object of the present invention is to provide a method for manufacturing such a differential gear.

The present invention is a differential gear comprising: a ring gear configured to be rotated by a driving force inputted thereto from a driving source; a differential case configured to be rotated together with the ring gear; a pinion shaft assembled on the differential case, the pinion shaft being configured to be rotated together with the differential case; and pinion gears rotatably mounted on the pinion shaft; and side gears configured to be meshed with the pinion gears; the differential case including a first boss part into which a first drive shaft is inserted, and a second boss part into which a second drive shaft opposed to the first drive shaft is inserted; wherein: the differential case is composed of: a first case body extending from pinion-shaft assembling parts on which the pinion shaft is assembled, to the ring gear; a second case body having the first boss part; and a third case body having the second boss part; the first case body is integrally formed by forging; the second case body is integrally formed by forging; the third case body is integrally formed by forging; the first case body and the second case body are joined to each other by welding; and the first case body and the third case body are joined to each other by welding.

According to the present invention, since it is not necessary for the differential case and the ring gear to be fastened to each other by means of bolts, the thickness of the differential case can be reduced, whereby the weight of the differential case can be decreased. Further, since the number of components (bolts) can be decreased, costs can be also decreased. Furthermore, the first case body extending from the pinions-shaft assembling parts to the part of the ring gear (including the ring gear) is integrally formed by forging. Namely, since the welded part between the first case body and the second case body, and the welded part between the first case body and the third case body, are located away from a torque transmission area (area between the pinion-shaft assembling parts and the ring gear), the welding parts of lower strength can be prevented from being damaged when a torque is transmitted.

In addition, the first case body extending from the pinion-shaft assembling parts to the ring gear, the second case body having the first boss part, and the third case body having the second boss part, are formed separately from each other by forging. Namely, the axial lengths of the respective case bodies are shorter than that of a conventional differential case element. Thus, forging of the respective case bodies can be facilitated.

Preferably, the first case body includes a flange part that supports the ring gear; the flange part and the ring gear have been subjected to a quenching process; and the flange part has a shape which is formed symmetrically with respect to a vertical surface that is positioned at a center of and is perpendicular to an axial length of a toothed profile of the ring gear.

In this case, due to the quenching process, the strengths of the flange part and the ring gear can be improved. During the quenching process, the surface of the flange part is shrunk by a heat generated by the quenching process. However, since the flange part has a shape which is formed symmetrically with respect to the vertical surface that is positioned at the center of and is perpendicular to the axial length of the toothed profile of the ring gear, the shrinkage on the one axial end side of the flange part and the shrinkage on the other axial end side thereof are substantially the same. Thus, a radial dimensional deviation in the axial direction of the toothed profile of the ring gear can be effectively restrained.

Preferably, the first case body includes a flange part that supports the ring gear; the flange part and the ring gear have been subjected to a quenching process; and inner circumferential surfaces of the first boss part and the second boss part have been subjected to a nitriding process, before the first case body and the second case body are welded to each other, and before the first case body and the third case body are welded to each other.

In this case, due to the nitriding process, a hardened layer of, e.g., iron nitride, is formed on the inner circumferential surfaces of the first boss part and the second boss part, whereby the durability thereof can be improved. In addition, due to the quenching process, the strengths of the flange part and the ring gear can be improved. In particular, the inner circumferential surfaces of the first boss part and the second boss part are subjected to the nitriding process, before the first case body and the second case body are welded to each other, and before the first case body and the third case body are welded to each other. Thus, the flange part and the ring gear of the first case body whose strengths have been improved by the quenching process (which is performed before the welding process) can be prevented from being annealed by a heat generated during the nitriding process. Accordingly, the strengths of the flange part and the ring gear can be effectively prevented from being lowered.

In addition, preferably, the first case body includes: a one-end-side opening configured to be fitted with the second case body, the one-end-side opening having a one-end-side inner circumferential surface in parallel with an axis line thereof; and an other-end-side opening configured to be fitted with the third case body, the other-end-side opening having an other-end-side inner circumferential surface in parallel with the axis line, the second case body includes an other-end-side outer circumferential surface configured to be in contact with the one-end-side inner circumferential surface of the first case body, the other-end-side outer circumferential surface being in parallel with an axis line thereof and having a diameter larger than an internal diameter of the one-end-side inner circumferential surface; the third case body includes a one-end-side outer circumferential surface configured to be in contact with the other-end-side inner circumferential surface of the first case body, the one-end-side outer circumferential surface being in parallel with an axis line thereof and having a diameter larger than an internal diameter of the other-end-side inner circumferential surface; and after the other-end-side outer circumferential surface of the second case body has been pressed into the one-end-side inner circumferential surface of the first case body, and the one-side outer circumferential surface of the third case body has been pressed into the other-end-side inner circumferential surface of the first case body, the first case body and the second case body, and the first case body and the third case body, are joined to each other by welding.

In this case, when the other-end-side outer circumferential surface of the second case body is pressed into the one-side-end inner circumferential surface of the first case body, the one-end-side inner circumferential surface in parallel with the axis line of the first case body and the other-end-side inner circumferential surface in parallel with the axis line of the second case body are brought into contact to each other. Thus, the axis center of the first case body and the axis center of the second case body can be aligned with each other. In addition, when the one-end-side outer circumferential surface of the third case body is pressed into the other-end-side inner circumferential surface of the first case body, the other-end-side inner circumferential surface in parallel with the axis line of the first case body and the one-end-side outer circumferential surface in parallel with the axis line of the third case body are brought into contact with each other. Thus, the axis center of the first case body and the axis center of the third case body can be aligned with each other. Namely, there can be easily formed the differential case in which the axis center of the first case body, the axis center of the second case body, and the axis center of the third case body are aligned with each other. As a result, the differential gear including the differential case of great precision can be provided.

BEST MODE FOR CARRYING OUT THE INVENTION

Figure 1:
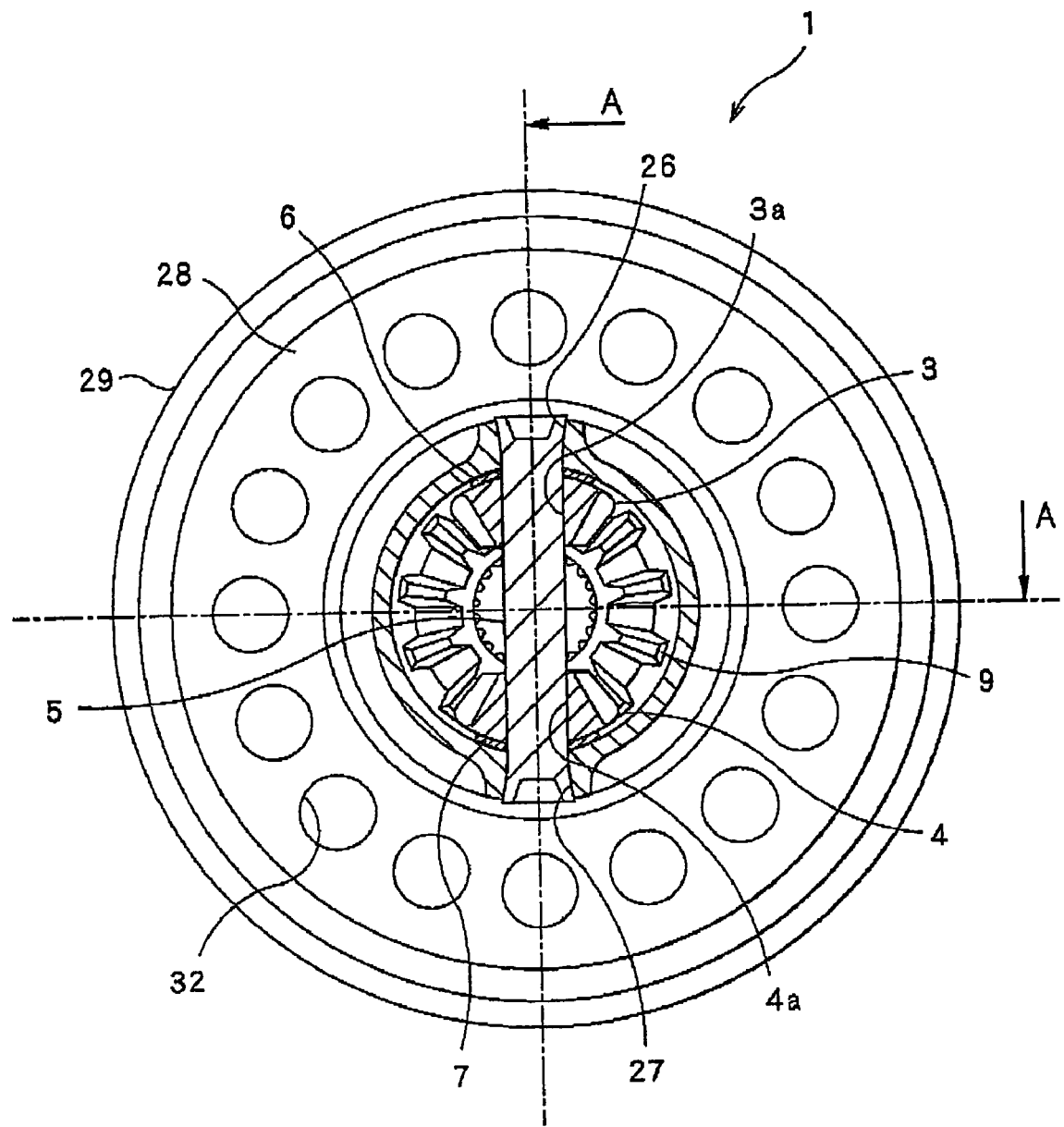
FIG. 1 is a sectional view of an embodiment of a differential gear of the present invention.
Figure 2:
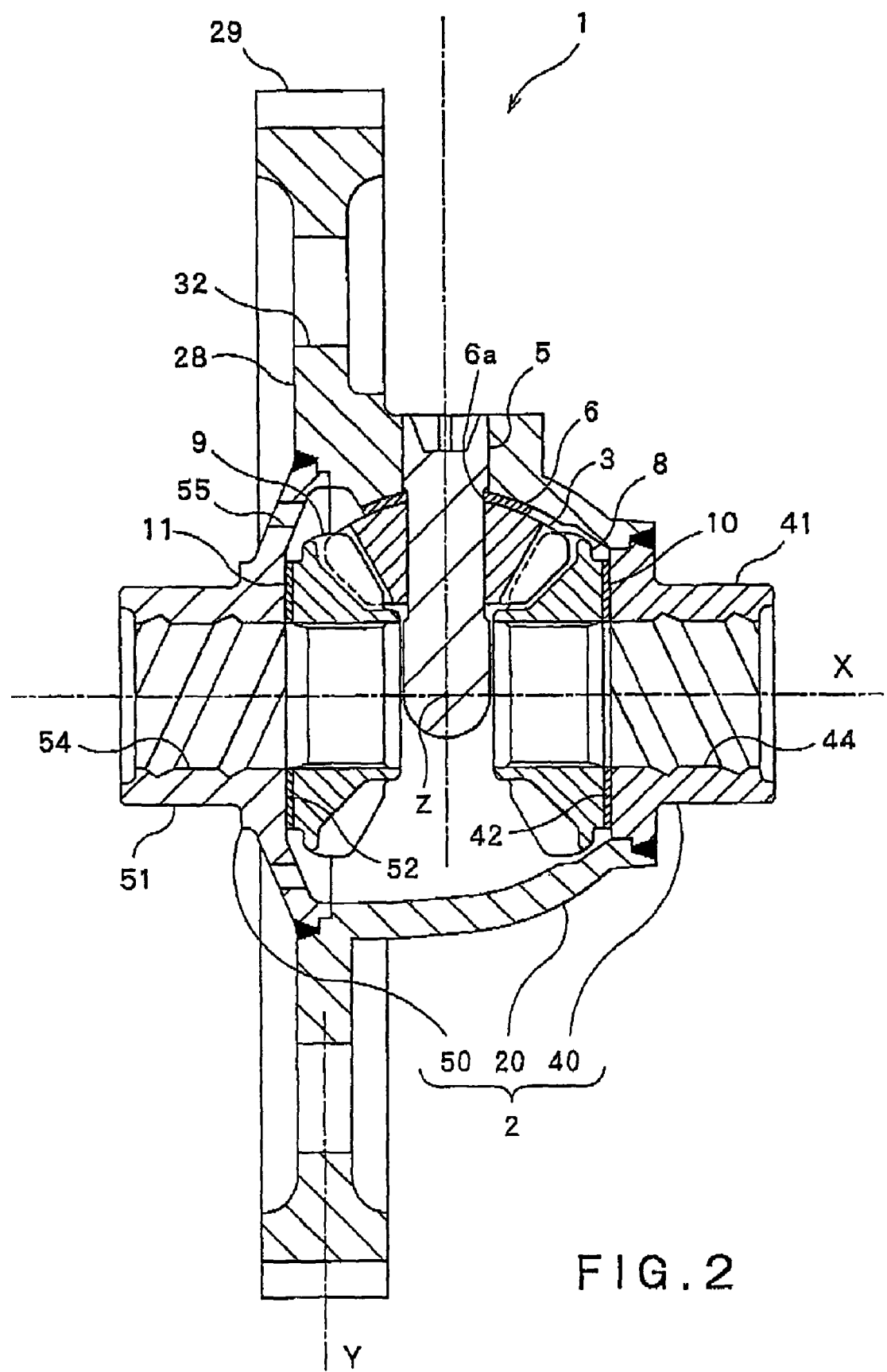
FIG. 2 is a sectional view of FIG. 1 taken along the line A-A.
Figure 3:
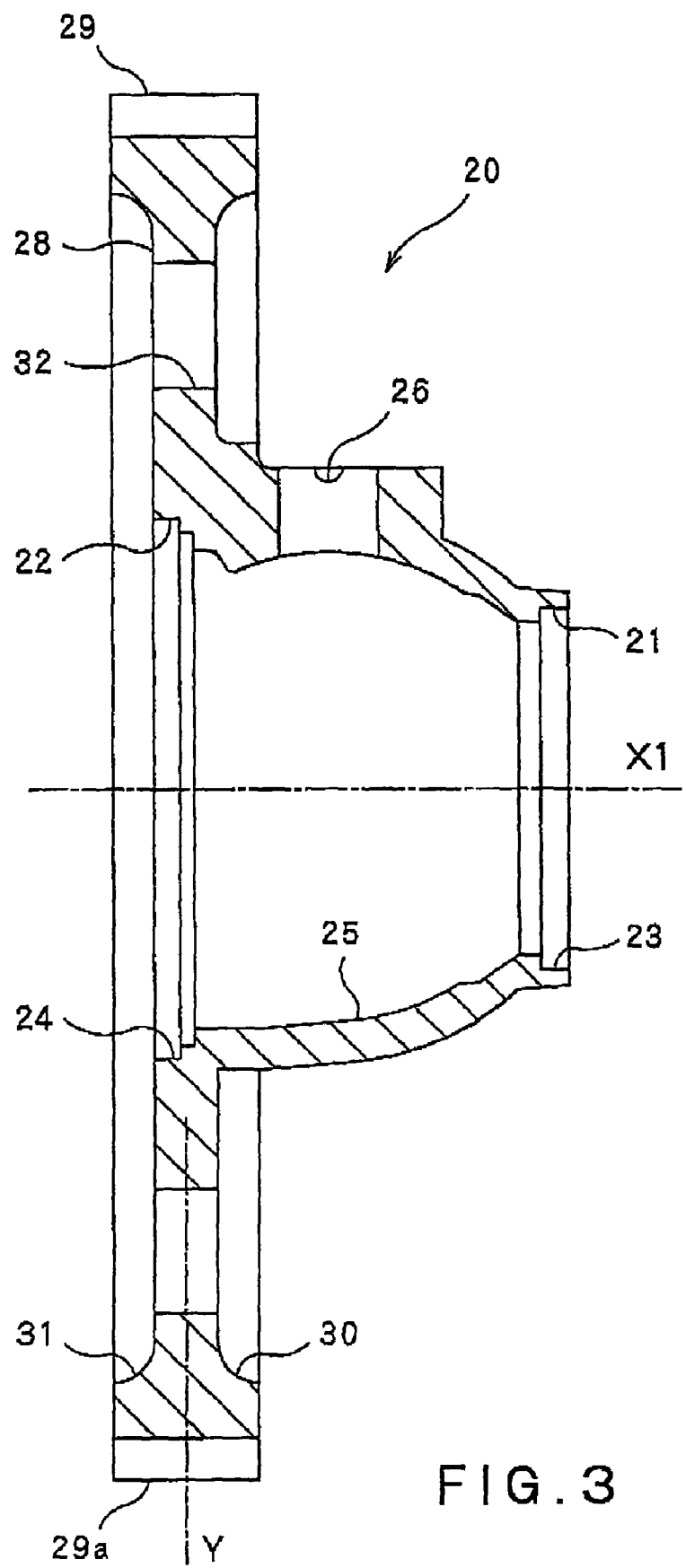
FIG. 3 is a sectional view of a first case body before a welding process.
Figure 4:
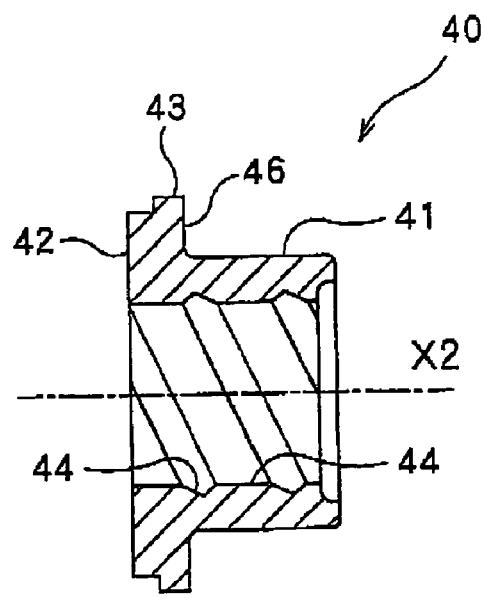
FIG. 4 is a sectional view of a second case body before a welding process.
Figure 5:
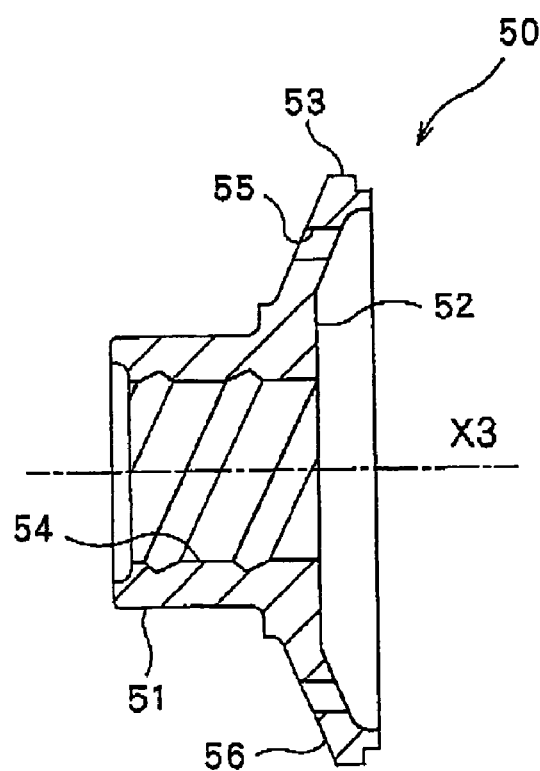
FIG. 5 is a sectional view of a third case body before a welding process.
Figure 6:
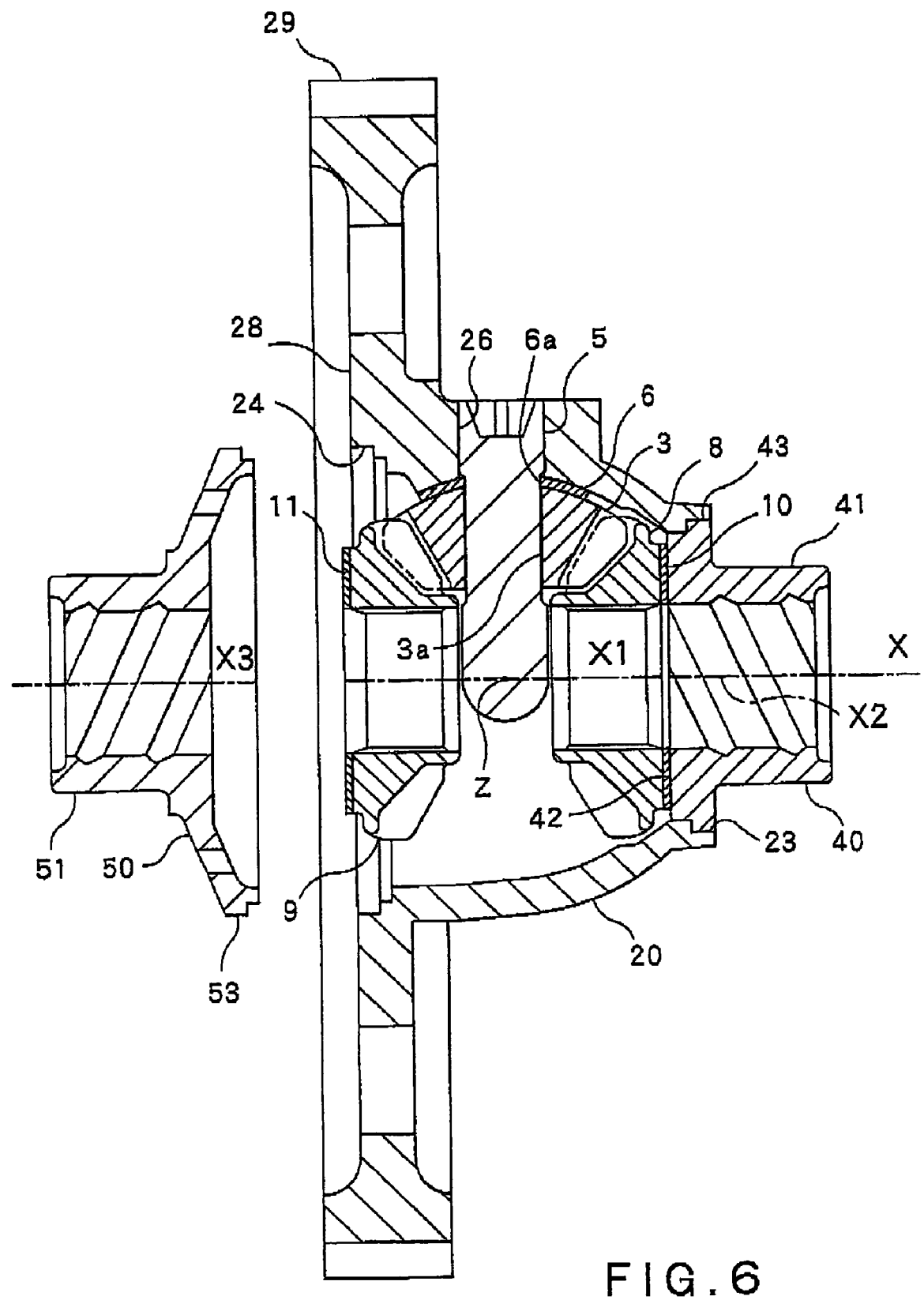
FIG. 6 is a sectional view for explaining a method for assembling the first case body, the second case body, and the third case body, according to the one embodiment of the present invention.

An embodiment of the present invention will be described in detail below with reference to the drawings. FIG. 1 is a sectional view of an embodiment of a differential gear of the present invention. FIG. 2 is a sectional view of FIG. 1 taken along the line A-A. FIG. 3 is a sectional view of a first case body before a welding process. FIG. 4 is a sectional view of a second case body before a welding process. FIG. 5 is a sectional view of a third case body before a welding process. FIG. 6 is a sectional view for explaining a method for assembling the first case body, the second case body, and the third case body, according to the one embodiment of the present invention.

A differential gear 1 is firstly described. As shown in FIG. 2, a differential case 2 of the differential gear 1 is composed of a first case body 20, a second case body 40, and a third case body 50.

The first case body 20 is firstly described. The first case body 20 is made of a low-carbon alloyed steel material such as SCM, SNC, SNCM, and SCR. The first case body 20 is formed by forging at first, and is then subjected to a predetermined cutting process, and a quenching process such as a carburizing-and-quenching process and an induction hardening process.

As shown in FIG. 3, the first case body 20 includes a one-end-side opening 21 formed in a one axial end of the first case body 20, and an other-end-side opening 22 formed in the other axial end thereof. Formed in the one-end-side opening 21 is a one-end-side inner circumferential surface 23 with which the second case body 40 comes into contact. Formed in the other-end-side opening 22 is an other-end-side inner circumferential surface 24 with which the third case body 50 comes into contact.

Inside the first case body 20, there is formed a gear chamber 25, in which pinion gears 3 and 4, side gears 8 and 9, a pinion shaft 5, thrust washers 6 and 7 for the pinion gear 3, 4, and thrust washers 20 and 11 for the side gear 8, 9 are provided. There are formed in a radial direction (in a vertical direction) outside the gear chamber 25 pinion-shaft assembling parts 26 and 27, by which the pinion shaft 5 can be assembled on the first case body 20 such that the pinion shaft 5 passes through the gear chamber 25.

Outside the first case body 20, there is formed a ring gear 29 via a flange part 28, which projects radially outward around an axis line X1. In order to reduce the weight of the flange part 28, a one-side-end annular recess 30 is formed in a one axial end of the flange part 28, and an other-side-end annular recess 31 is formed in the other axial end of the flange part 28. In order to further reduce the weight, a plurality of through holes 32 are formed between the one-end-side annular recess 30 and the other-end-side annular recess 31. The flange part 28 has a symmetric shape with respect to a vertical surface Y positioned on a center of and perpendicular to an axial length of a toothed profile 29a of the ring gear 29.

Next, the second case body 40 is described. The second case body 40 is made of a low-carbon or medium-carbon steel material such as S35C and S45C. The second case body 40 is formed by forging at first, and is then subjected to a predetermined cutting process and a nitriding process. Although various nitriding methods, such as a gas nitriding process and a soft nitriding (nitro carburizing) process, may be employed for the nitriding process, it is preferable that a suitable nitriding method is selected in consideration of a material used for the second case body 40.

As shown in FIG. 4, the second case body 40 includes: on a one axial end thereof, a first boss part 41 that is axially extended; and, on the other axial end thereof, an other-end-side plane 42 that is perpendicular to an axis line X2. In addition, formed on the other axial end side is an other-end-side collar part 46, which is projected radially outward. Formed on an outer circumference of the other-end-side collar part 46 is an other-end-side outer circumferential surface 43, with which the one-end-side inner circumferential surface 23 of the first case body 20 comes into contact. The other-end-side outer circumferential surface 43 has a diameter larger than that of the one-end-side inner circumferential surface 23 of the first case body 20 by about 0.01 mm to 0.1 mm.

Inside the second case body 40, there is formed a first through hole 44 axially passing therethrough. A spiral lubrication groove 45 is circumferentially formed inside the first through hole 44. A surface of the second case body 40 including a surface of the first through hole 44 is coated with a hardened layer made of iron nitride which has been formed by the nitriding process.

Next, the third case body 50 is described. The third case body 50 is made of a low-carbon or medium-carbon steel material such as S35C and S45C. The third case body 50 is formed by forging at first, and is then subjected to a predetermined cutting process and a nitriding process. Although various nitriding methods, such as a gas nitriding process and a soft nitriding process, may be employed for the nitriding process, it is preferable that a suitable nitriding method is selected in consideration of a material used for the third case body 50.

As shown in FIG. 5, the third case body 50 includes, on a one axial end side thereof, a one-end-side plane 52 that is perpendicular to an axis line X3. Formed on the one axial end side thereof is a one-end-side collar part 56, which is projected radially outward around the axis line X3. Formed on an outer circumference of the one-end-side collar part 56 is a one-end-side outer circumferential surface 53, with which the other-end-side inner circumferential surface 24 of the first case body 20 comes into contact. In addition, a plurality of lubrication holes 55 in parallel with the axis line X3 are formed in the one-end-side collar part 56. The one-end-side outer circumferential surface 53 has a diameter larger than that of the other-end-side inner circumferential surface 24 of the first case body 20 by about 0.01 mm to 0.1 mm.

The third case body 50 includes, on the other axial end thereof, a second boss part 51 that is axially extended. Inside the third case body 50, there is formed a second through hole 54 axially passing therethrough. A surface of the third case body 50 including a surface of the second through hole 54 is coated with a hardened layer made of iron nitride having a thickness of about 0.1 mm to 0.3 mm, the hardened layer having been formed by the nitriding process.

After the inner components such as the pinion shaft 5, the pinion gears 3, 4, the side gears 8, 9 and the thrust washers 6, 7, 10, 11 are attached, the differential case 2 is manufactured by bringing the other-end-side outer circumferential surface 43 of the second case body 40 into contact with the one-end-side inner circumferential surface 23 of the first case body 20, bringing the one-end-side outer circumferential surface 53 of the third case body 50 into contact with the other-end-side inner circumferential surface 24 of the first case body 20; and by joining the one-end-side inner circumferential surface 23 and the other-end-side outer circumferential surface 43 to each other and the other-end-side inner circumferential surface 24 and the one-end-side outer circumferential surface 53 to each other, by means of a welding method selected from an electron-beam welding method, a laser welding method, and a resistance welding method.

In this embodiment, only the second case body 40 and the third case body 50 are subjected to the nitriding process, before the first case body 20 and the second case body 40 are welded to each other, and before the first case body 20 and the third case body 50 are welded to each other. Namely, the first case body 20 is not subjected to any nitriding process. Thus, the flange part 28 and the ring gear 29 of the first case body 20, which have been hardened by the quenching process, are prevented from being annealed and softened by a heat generated during the nitriding process.

Next, an inner structure of the differential gear 1 is described in detail with reference to FIG. 2. Inside the differential case 2, the pinion shaft 5 is assembled on the differential case 2 by caulking opposed ends of the pinion shaft 5 to the pinion-shaft assembling parts 26 and 27 of the first case body 20. The pinion gears 3 and 4 are rotatably mounted on the pinion shaft 5. The thrust washers 6 and 7 for the pinion gear 3, 4 are disposed between the pinion gears 3 and 4 and the differential case 2, and the thrust washers 10 and 11 for the side gear 8, 9 are disposed between the side gears 8 and 9, which can be meshed with the pinion gears 3 and 4, and the differential case 2. The side gears 8 and 9 have holes in the axial direction. An edge of a first drive shaft, not shown, is fitted in the hole of the side gear 8, and an edge of a second drive shaft, not shown, is fitted in the hole of the side gear 9. At this time, the first drive shaft is positioned in the first through hole 44, and the second drive shaft is positioned in the second through hole 54.

Next, a method of assembling the differential gear 1 is described with reference to FIGS. 1 and 6.

At first, there is prepared the first case body 20 whose flange part 28 and whose ring gear 29 have been subjected to the quenching process. The other-end-side outer circumferential surface 43 of the second case body 40 is pressed into the one-end-side inner circumferential surface 23 formed in the one end of the first case body 20, whereby the other-end-side outer circumferential surface 43 and the one-end-side inner circumferential surface 23 are brought into contact with each other. At this time, the axis center X1 of the first case body 20 and the axis center X2 of the second case body 40 are aligned with each other.

Then, the one thrust washer 10 for the side gear 8 is attached to the other-end-side plane 42 of the second case body 40. Thereafter, a one end side (reverse-of-toothed-profile side) of the side gear 8 is brought into contact with the thrust washer 10 for the side gear 8 such that a toothed profile side of the side gear 8 faces a center Z of the differential case 2. At this time, an axis center of the side gear 8 is aligned with the axial line X of the differential gear 1.

Following thereto, the pinion gear 3 to which the one thrust washer 6 for the pinion gear 3 has been attached on a reverse-of-toothed-profile side thereof, and the pinion gear 4 to which the other thrust washer 7 for the pinion gear 4 has been attached on the reverse-of-toothed-profile side thereof, are positioned to be opposed to each other with respect to the axis line X of the differential gear 1 such that the pinion gears 3 and 4 are respectively meshed with the side gear 8. At this time, the pinion-shaft assembling parts 26 and 27 provided on the first case body 20, pinion gear holes 3a and 4a formed in the pinion gears 3 and 4, and holes 6a and 7a formed in the thrust washers 6 and 7 for the pinion gear 3, 4, are arranged in a row.

After that, the pinion shaft 5 is inserted through the pinion-shaft assembling part 26, the hole of the thrust washer 6 for the pinion gear 3, and the pinion gear hole 3a of the pinion gear 3, to the axis center X of the differential gear 1, and is further guided to the pinion gear hole 4a of the pinion gear 4, the hole of the thrust washer 7 for the pinion gear 4, and the pinion-shaft assembling part 27, which are in symmetric with the pinion-shaft assembling part 26, the hole of the thrust washer for pinion gear 6, and the pinion gear hole 3a of the pinion gear 3 with respect to the axis center X. Thus, the pinion shaft 5 is suitably arranged at a predetermined position of the first case body 20. Then, the opposed ends of the pinion shaft 5 are plastically deformed on the pinion-shaft assembling parts 26 and 27 by a caulking tool, not shown. Thus, the pinion shaft 5 is secured on the first case body 20.

Then, the side gear 9 to which the other thrust washer 11 for the side gear 9 has been attached on a reverse-of-toothed-profile side thereof is positioned such that a toothed profile side of the side gear 9 faces the center Z of the differential case 2 so as to be meshed with the pinion gears 3 and 4. At this time, the axis center of the side gear 9 is aligned with the axis line X of the differential gear 1.

Subsequently, the one-end-side outer circumferential surface 53 of the third case body 50 is pressed into the other-end-side inner circumferential surface 24 of the other end of the first case body 20 so that the one-end-side outer circumferential surface 53 and the other-end-side inner circumferential surface 24 are brought into contact with each other. At this time, the axis center X of the differential gear 1 and the axis center X3 of the third case body 50 are aligned with each other.

Finally, the contact part between the first case body 20 and the second case body 40, and the contact part between the first case body 20 and the third case body 50, are circumferentially joined to each other by welding in parallel with the axis line X. Thus, the assemblage of the differential gear 1 is completed.

As described above, the differential gear 1 in this embodiment includes: the ring gear 29 configured to be rotated by a driving force inputted thereto from a driving source; the differential case 2 configured to be rotated together with the ring gear 29; the pinion shaft 5 assembled on the differential case 2, the pinion shaft 5 being configured to be rotated together with the differential case 2; the pinion gears 3 and 4 rotatably mounted on the pinion shaft 5, and the side gears 8 and 9 configured to be meshed with the pinion gears 3 and 4. The differential case 2 has the first boss part 41 into which the first drive shaft (not shown) is inserted, and the second boss part 51 into which the second drive shaft (not shown) opposed to the first drive shaft is inserted. The differential case 2 is composed of: the first case body 20 extending from the pinion-shaft assembling parts 26 and 27 on which the pinion shaft 5 is assembled, to the ring gear 29; the second case body 40 having the first boss part 41; and the third case body 50 having the second boss part 51. The first case body 20 is integrally formed by forging, the second case body 40 is integrally formed by forging, and the third case body 50 is integrally formed by forging. The first case body 20 and the second case body 40 are joined to each other by welding, and the first case body 20 and the third case body 50 are joined to each other by welding.

According to the differential gear 1 in the aforementioned embodiment, since it is not necessary for the differential case 2 and the ring gear 29 to be fastened to each other by means of bolts. Thus, the thickness of the differential case 2 can be reduced, whereby the weight of the differential case 2 can be decreased. Further, since the number of components (bolts) can be decreased, costs can be also decreased. Furthermore, the first case body 20 extending from the pinion shaft assembling parts 26 and 27 to the part of the ring gear 29 (including the ring gear 29) is integrally formed by forging. Namely, since the welded part between the first case body 20 and the second case body 40, and the welded part between the first case body 20 and the third case body 50, are located away from a torque transmission area (area between the pinion shaft assembling parts 26 and 27 and the ring gear 29), the welding parts of lower strength can be prevented from being damaged when a torque is transmitted.

In addition, the first case body 20 extending from the pinion-shaft assembling parts 26 and 27 to the ring gear 29, the second case body 40 having the first boss part 41, and the third case body 50 having the second boss part 51, are formed separately from each other by forging. Namely, the axial lengths of the respective case bodies 20, 40, and 50 are shorter than that of a conventional differential case element. Thus, forging of the respective case bodies 20, 40, and 50 can be facilitated.

In addition, in this embodiment, the first case body 20 has the flange part 28 that supports the ring gear 29. The flange part 28 and the ring gear 29 have been subjected to the quenching process. The flange part 28 has a shape which is formed symmetrically with respect to the vertical surface Y that is positioned at the center of and is perpendicular to the axial length of the toothed profile 29a of the ring gear 29.

Thus, due to the quenching process, the strengths of the flange part 28 and the ring gear 29 can be improved. During the quenching process, the surface of the flange part 28 is shrunk by a heat generated by the quenching process. However, since the flange part 28 has the shape which is formed symmetrically with respect to the vertical surface Y that is positioned at the center of the axial length of the toothed profile of the ring gear 29a and that is perpendicular to the axial direction, the shrinkage on the one axial end side of the flange part 28 and the shrinkage on the other axial end side thereof are substantially the same. Thus, a radial dimensional deviation in the axial direction of the toothed profile 29a of the ring gear 29 can be effectively restrained.

In addition, in this embodiment, the first case body 20 has the flange part 28 that supports the ring gear 29. The flange part 28 and the ring gear 29 have been subjected to the quenching process. The inner circumferential surfaces of the first boss part 41 and the second boss part 51 have been subjected to the nitriding process, before the first case body 20 and the second case body 40 are welded to each other, and before the first case body 20 and the third case body 50 are welded to each other. The first case body 20 has not been subjected to the nitriding process.

Thus, due to the nitriding process, a hardened layer made of iron nitride is formed on the inner circumferential surfaces of the first boss part 41 and the second boss part 51, whereby the durability thereof can be improved. In addition, due to the quenching process, the strengths of the flange part 28 and the ring gear 29 can be improved. In particular, the inner circumferential surfaces of the first boss part 41 and the second boss part 51 are subjected to the nitriding process, before the first case body 20 and the second case body 40 are welded to each other, and before the first case body 20 and the third case body 50 are welded to each other. The first case body 20 is not subjected to the nitriding process. Thus, the flange part 28 and the ring gear 29 of the first case body 20 whose strengths have been improved by the quenching process (which is performed before the welding process) can be prevented from being annealed by a heat generated during the nitriding process. Accordingly, the strengths of the flange part 28 and the ring gear 29 can be effectively prevented from being lowered.

In this embodiment, the first case body 20 has: the one-end-side opening 21 configured to be fitted with the second case body 40, the one-end-side opening 21 having the one-end-side inner circumferential surface 23 in parallel with the axis line X1; and the other-end-side opening 22 configured to be fitted with the third case body 50, the other-end-side opening 22 having the other-end-side inner circumferential surface 24 in parallel with the axis line X1. The second case body 40 has the other-end-side outer circumferential surface 43 configured to be in contact with the one-end-side inner circumferential surface 23 of the first case body 20, the other-end-side outer circumferential surface 43 being in parallel with the axis line X2 and having the diameter larger than an internal diameter of the one-end-side inner circumferential surface 23. The third case body 50 has the one-end-side outer circumferential surface 53 configured to be in contact with the other-end-side inner circumferential surface 24 of the first case body 20, the one-end-side outer circumferential surface 53 being in parallel with the axis line X3 and having the diameter larger than an internal diameter of the other-end-side inner circumferential surface 24. After the other-end-side outer circumferential surface 43 of the second case body 40 has been pressed into the one-end-side inner circumferential surface 23 of the first case body 20, and the one-end-side outer circumferential surface 53 of the third case body 50 has been pressed into the other-end-side inner circumferential surface 24 of the first case body 20, the first case body 20 and the second case body 40, and the first case body 20 and the third case body 50, are joined to each other by welding.

Thus, when the other-end-side outer circumferential surface 43 of the second case body 40 is pressed into the one-side-end inner circumferential surface 23 of the first case body 20, the one-end-side inner circumferential surface 23 in parallel with the axis line X1 of the first case body 20 and the other-end-side inner circumferential surface 43 in parallel with the axis line X2 of the second case body 40 are brought into contact to each other. Therefore, the axis center X1 of the first case body 20 and the axis center X2 of the second case body 40 can be aligned with each other. In addition, when the one-end-side outer circumferential surface 53 of the third case body 50 is pressed into the other-end-side inner circumferential surface 24 of the first case body 20, the other-end-side inner circumferential surface 24 in parallel with the axis line X1 of the first case body 20 and the one-end-side outer circumferential surface 53 in parallel with the axis line X3 of the third case body 50 are brought into contact with each other. Therefore, the axis center X1 of the first case body 20 and the axis center X3 of the third case body 50 can be aligned with each other. Namely, there can be easily formed the differential case 2 in which the axis center X1 of the first case body 20, the axis center X2 of the second case body 40, and the axis center X3 of the third case body 50 are aligned with each other. As a result, the differential gear 1 including the differential case 2 of great precision can be provided.

The first case body 20, the second case body 40, and the third case body 50 may be formed by any one of hot forging, cold forging, and warm forging. Further, not limited to an electron-beam welding method, a laser welding method, and a resistance welding method, the first case body 20 and the second case body 40, and the first case body 20 and the third case body 50 may be welded to each other by another welding method.

What is claimed is:

1. A differential gear comprising:
   a ring gear configured to be rotated by a driving force inputted thereto from a driving source;
   a differential case configured to be rotated together with the ring gear;
   a pinion shaft assembled on the differential case, the pinion shaft being configured to be rotated together with the differential case;
   pinion gears rotatably mounted on the pinion shaft; and
   side gears configured to be meshed with the pinion gears;
   the differential case including a first boss part into which a first drive shaft is inserted, and a second boss part into which a second drive shaft opposed to the first drive shaft is inserted;
   wherein:
   the differential case is composed of:
      a first case body being made of a single material and extending from pinion-shaft assembling parts on which the pinion shaft is assembled, to the ring gear, the first case body having an aperture that receives the pinion shaft;
      a second case body having the first boss part; and
      a third case body having the second boss part;
   the first case body is integrally formed by forging;
   the second case body is integrally formed by forging;
   the third case body is integrally formed by forging;
   the first case body and the second case body are joined to each other by welding; and
   the first case body and the third case body are joined to each other by welding.

2. The differential gear according to claim 1, wherein:
   the first case body includes a flange part that supports the ring gear;
   the flange part and the ring gear have been subjected to a quenching process; and
   the flange part has a shape which is formed symmetrically with respect to a vertical surface that is positioned at a center of and is perpendicular to an axial length of a toothed profile of the ring gear.

3. The differential gear according to claim 1, wherein:
   the first case body includes a flange part that supports the ring gear;
   the flange part and the ring gear have been subjected to a quenching process; and
   inner circumferential surfaces of the first boss part and the second boss part have been subjected to a nitriding process, before the first case body and the second case body are welded to each other, and before the first case body and the third case body are welded to each other.

4. The differential gear according to claim 1, wherein:
   the first case body includes:
   a one-end-side opening configured to be fitted with the second case body, the one-end-side opening having a one-end-side inner circumferential surface in parallel with an axis line thereof; and
   an other-end-side opening configured to be fitted with the third case body, the other-end-side opening having an other-end-side inner circumferential surface in parallel with the axis line;
   the second case body includes an other-end-side outer circumferential surface configured to be in contact with the one-end-side inner circumferential surface of the first case body, the other-end-side outer circumferential surface being in parallel with an axis line thereof and having a diameter larger than an internal diameter of the one-end-side inner circumferential surface;
   the third case body includes a one-end-side outer circumferential surface configured to be in contact with the other-end-side inner circumferential surface of the first case body, the one-end-side outer circumferential surface being in parallel with an axis line thereof and having a diameter larger than an internal diameter of the other-end-side inner circumferential surface; and
   after the other-end-side outer circumferential surface of the second case body has been pressed into the one-end-side inner circumferential surface of the first case body, and the one-side outer circumferential surface of the third case body has been pressed into the other-end-side inner circumferential surface of the first case body, the first case body and the second case body, and the first case body and the third case body, are joined to each other by welding.

5. A method of manufacturing a differential gear comprising: a ring gear configured to be rotated by a driving force inputted thereto from a driving source, a differential case configured to be rotated together with the ring gear, a pinion shaft assembled on the differential case, the pinion shaft being configured to be rotated together with the differential case, pinion gears rotatably mounted on the pinion shaft, and side gears configured to be meshed with the pinion gears, the differential case including a first boss part into which a first drive shaft is inserted, and a second boss part into which a second drive shaft opposed to the first drive shaft is inserted, wherein the differential case is composed of: a first case body being made of a single material and extending from pinion-shaft assembling parts on which the pinion shaft is assembled, to the ring gear, the first case body having an aperture that receives the pinion shaft, a second case body having the first boss part, and a third case body having the second boss part, the first case body is integrally formed by forging, the second case body is integrally formed by forging, the third case body is integrally formed by forging, the first case body and the second case body are joined to each other by welding, and the first case body and the third case body are joined to each other by welding, the method comprising:

a nitriding step in which inner circumferential surfaces of the first boss part and the second boss part are subjected to a nitriding process, before the first case body and the second case body are welded to each other, and before the first case body and the third case body are welded to each other; and a welding step succeeding the nitriding step, in which the first case body and the second case body are welded to each other, and the first case body and the third case body are welded to each other.

6. A method of manufacturing a differential gear comprising: a ring gear configured to be rotated by a driving force inputted thereto from a driving source, a differential case configured to be rotated together with the ring gear, a pinion shaft assembled on the differential case, the pinion shaft being configured to be rotated together with the differential case, pinion gears rotatably mounted on the pinion shaft; and side gears configured to be meshed with the pinion gears, the differential case including a first boss part into which a first drive shaft is inserted, and a second boss part into which a second drive shaft opposed to the first drive shaft is inserted, wherein the differential case is composed of: a first case body being made of a single material and extending from pinion-shaft assembling parts on which the pinion shaft is assembled, to the ring gear, the first case body having an aperture that receives the pinion shaft, a second case body having the first boss part, and a third case body having the second boss part, the first case body is integrally formed by forging, the second case body is integrally formed by forging, the third case body is integrally formed by forging, the first case body and the second case body are joined to each other by welding, and the first case body and the third case body are joined to each other by welding, wherein: the first body includes a one-end-side opening configured to be fitted with the second case body, the one-end-side opening having a one-end-side inner circumferential surface in parallel with an axis line thereof; and an other-end-side opening configured to be fitted with the third case body, the other-end-side opening having an other-end-side inner circumferential surface in parallel with the axis line, the second case body includes an other-end-side outer circumferential surface configured to be in contact with the one-end-side inner circumferential surface of the first case body, the other-end-side outer circumferential surface being in parallel with an axis line thereof and having a diameter larger than an internal diameter of the one-end-side inner circumferential surface, the third case body includes a one-end-side outer circumferential surface configured to be in contact with the other-end-side inner circumferential surface of the first case body, the one-end-side outer circumferential surface being in parallel with an axis line thereof and having a diameter larger than an internal diameter of the other-end-side inner circumferential surface, and after the other-end-side outer circumferential surface of the second case body has been pressed into the one-end-side inner circumferential surface of the first case body, and the one-side outer circumferential surface of the third case body has been pressed into the other-end-side inner circumferential surface of the first case body, the first case body and the second case body, and the first case body and the third case body, are joined to each other by welding, the method comprising:

a first pressing step in which the other-end-side outer circumferential surface of the second case body is pressed into the one-end-side inner circumferential surface of the first case body;

a second pressing step in which the one-end-side outer circumferential surface of the third case body is pressed into the other-end-side inner circumferential surface of the first case body; and a welding step succeeding the first pressing step and the second pressing step, in which the first case body and the second case body are welded to each other, and the first case body and the third case body are welded to each other.

* * * * *